Oct. 21, 1952            R. F. MILLER            2,615,076
METHOD AND APPARATUS FOR TESTING AND LOCATING
FAULTS IN CONTINUOUS CONDUCTORS

Filed Dec. 13, 1948            2 SHEETS—SHEET 1

Richard F. Miller
INVENTOR.

BY Clarence A. O'Brien
and Harvey B. Jacobson
Attorneys

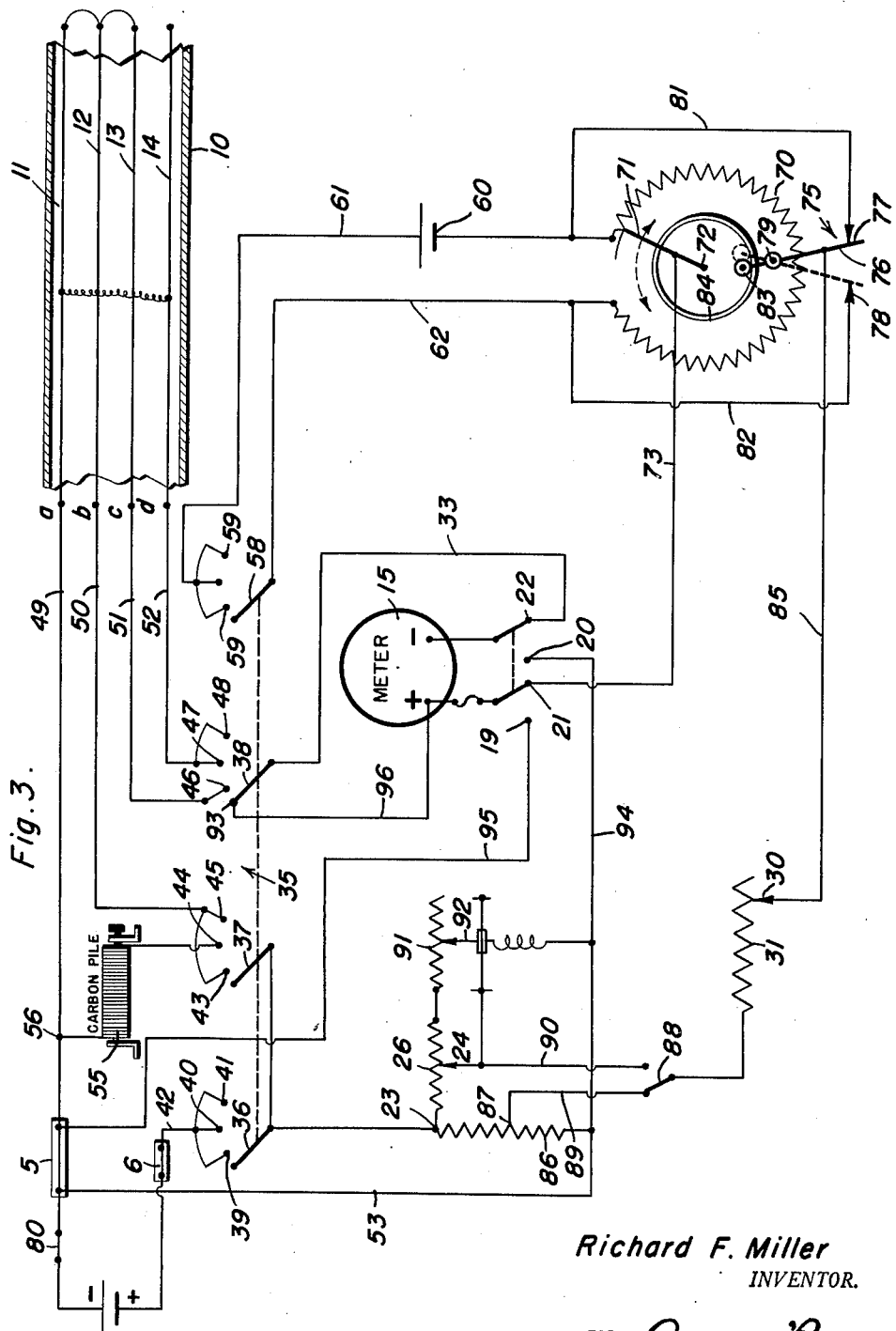

Patented Oct. 21, 1952

2,615,076

UNITED STATES PATENT OFFICE 2,615,076

METHOD AND APPARATUS FOR TESTING AND LOCATING FAULTS IN CONTINUOUS CONDUCTORS

Richard F. Miller, Harvard, Nebr.

Application December 13, 1948, Serial No. 64,948

11 Claims. (Cl. 175—183)

This is a continuation in part of the co-pending application Serial No. 556,784, now abandoned.

This invention relates to testing and fault locating instruments for localizing faults in an insulated conductor, and it is particularly applicable to cables, overhead transmission lines and like signal current and power transmission lines running over long distances. Instruments of this type are mainly used for the prediction of the approximate location of the fault permitting to find its exact location by search methods without undue delay and with a minimum of expenditure in man power and time.

A number of testing and fault locating devices are known, in which a number of comparative measurements is carried out, these devices almost invariably using various modifications of a Wheatstone bridge, such as a Kelvin bridge, a Murray loop or a Varley loop circuit. Fault locators of this type, when simple and accurate, almost invariably entail calculations of a higher type to locate the fault and when equipped so as to furnish directly the desired result are of a complicated type which can only be used by owners of large networks.

No provision is moreover made in these instruments for the elimination of the influence of stray currents or parasitic currents invading a ground connection, either made during and for the purpose of the measurement or resulting from a defect in the cable. The instruments especially those of the simple type are used together with a separate portable potentiometer, which may serve the above named purpose of compensation, if properly used and connected. Again the use of such a potentiometer is based on the assumption that the measurements are carried out by highly trained experts.

The invention has for its main and primary purpose to provide a fault locating method and a fault locating instrument using said method which permits great simplicity of construction and high accuracy and which will nevertheless furnish a result which can be translated immediately into the desired location without calculation or other intermediate step requiring the skill of the highly trained expert.

A further primary object of the invention consists in providing built-in neutralizing means which are usable in connection with the measuring method and as a part of the same for eliminating the inaccuracies or defective measurements which are produced by stray currents or parasitic currents invading one of the ground connections.

Essentially therefore the method according to the invention permits to locate line to line and line to ground faults in cables and overhead lines with a plurality of conductors or strands by means of a series of measurements which furnish direct results and which may be made automatically by means of an instrument requiring merely the operation of switches and the reading of a meter or the adjustment of a meter to a certain predetermined reading. Such an activity does not require a higher skill.

The method consists, briefly stated, in a number of comparative measurements, which first establish a balanced circuit condition between clear and faulty conductors and resistances within the instrument and then compare the meter readings between measurements in which the meter is connected with the defective conductors only and a reading in which it is connected in the same manner while simultaneously the balanced condition is re-established. These two measurements are so related that their ratio is directly indicative of the distance of the defect from the instrument. A neutralizing automatic polarity reversing compensating potentiometer may be directly associated with the instrument and may be operated during one of the measurements, if the meter reading shows the presence of stray currents, which potentiometer then remains set for all further measurements and corrects automatically the deviations due to such stray currents.

It is therefore one of the objects of the invention to provide an instrument capable of making the above described measurements required by the above explained method in an automatic sequence, the measurements being produced by operating a switching means.

It is a further object of the invention to provide a fault locating instrument with a selector switch with a definite number of steps, corresponding to the different measurements to be made in successive stages of operation, and with further adjustment switches adapted to adjust the meter readings or to bring them to definite values during these stages of the operation.

It is a further object of the invention to provide a fault locating instrument, usable in connection with cables of low resistance and providing the necessary adjustment of the voltage, eliminating the influence of the voltage drop due to such low resistance.

It is a further object of the invention to provide a fault locating instrument which directly contains the neutralizing means for neutralizing or for compensating stray currents which means are adjusted and brought into operation during one of the intermediate measurements and thereafter compensate the effects of stray currents during all subsequent stages of operation.

Further more specific objects will be clearly apparent in the following detailed specification.

The invention is illustrated in the accompanying drawings showing two embodiments of the same. It is however to be understood that these embodiments are shown by way of example only, in order to serve as a base for the explanation of the principle. The specification and drawing do not intend to provide a survey of the various applications of the principle of the invention but provide sufficient information to enable the expert skilled in this art to modify or apply the same so as to adapt it to conditions somewhat differing from those described. Modifications of the embodiments shown do therefore not necessarily indicate a departure from the invention.

In the drawing:

Figure 3 is a diagram of the connections of an improved instrument adapted to eliminate errors due to stray currents.

Figure 1:
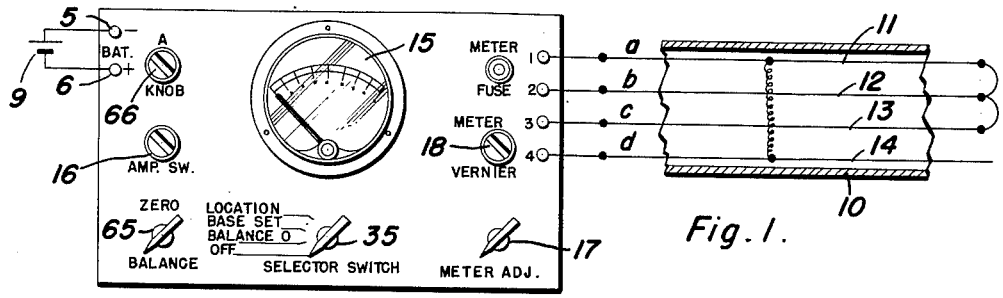
Figure 1 is a top view of the instrument shown when connected with a faulty insulated conductor.

In the drawings the testing instrument is shown as being connected with a faulty cable 10 usually of considerable length consisting of a plurality of strands 11, 12, 13, 14. The nature of the fault must of course have been determined before the instrument is used. The instrument as stated above and as explained below serves the purpose of fault location and of prediction of the cable length, stretch or spot where searching for the fault by search methods has to be carried out.

The testing instrument consists of the meter 15 which is of the usual galvanometer type with a range of operation selected in accordance with conditions. This meter is connected with a double throw double pole switch 16 with two contactor arms adapted to connect said meter either with contacts 19, 20 or with contacts 21, 22. Contact 19 is connected with one end 23 of a potentiometer resistance 26, and contact 21 with the movable contact 24 of the potentiometer, generally indicated by 25 and operated by knob 65. The other end 27 of the potentiometer resistance is connected with contact 20 of the second contactor arm. A fixed resistor 28 of high ohmic resistance value may be inserted in the lead 29 connecting the end of the potentiometer resistance with contact 20.

The contact 22 of switch 16 is connected with the movable contact 30 of a high ohmic meter adjustment rheostat 31. Contact 30 is moved by the meter adjustment knob 17. A vernier resistance of the usual type may be provided (not shown) adjusted by vernier knob 18 in order to obtain greatest precision in the meter adjustment.

A selector switch, indicated generally by the reference numeral 35, consists of three ganged contactor arms 36, 37, 38, each of which cooperates with three contacts. The switch is thus capable of assuming four different positions, three of which, determined by the three contacts, shall be referred to hereafter as positions I, II and III.

Contacts 39, 40, 41 of contactor 36 are all connected to the same lead 42. Contacts 43 and 45 of contactor 37 are both connected to lead 50, while contact 44 is connected with the battery lead 49 by means of an adjustable rheostat 55 which may be a compression resistance such as a carbon pile. This resistance is operated by means of knob 66. Contact 46 of contactor 38 is connected to lead 51, while contacts 47, 48 are both connected to lead 52. The ends of the leads 49, 50, 51, 52 are fixed to binding posts 1, 2, 3, 4 on the instrument, respectively, with which the strands 11, 12, 13, 14 of the faulty cable 10 to be tested are connected, the junction points with the cable strands being indicated by a, b, c, d. Where there are two clear wires 12, 13 available which are not affected by the short circuit, crossing of the wires, or other fault they are connected with the junction points b, c, those strands which are affected are connected with junction points a and d.

Leads 49 and 42 are connected to the two binding posts 5 and 6, respectively, which are provided for connection with the poles of the testing battery 9. Binding post 5 is also connected with the end 27 of the potentiometer resistance by conductor 53. Binding post 6 as already mentioned is connected with the contacts 39, 40, 41 of contactor 36.

In order to test the cable, the strands 11, 12, 13 connected with terminals a, b, c are all connected together at the farther end. The battery voltage has, of course, to be selected in accordance with the circumstances and with the resistance value of the line tested. Otherwise, it is best selected as high as possible under the existing conditions.

The operation of the instrument is the following:

Let it be assumed that a line to line fault has to be located in a cable of considerable length having a plurality of cable strands. The cable strands affected by the cross are connected with junction points a and d and further strands not affected by the fault are connected with b and c.

The strands connected to terminals a, b, c at the far end of the cable are connected with each other.

When the instrument is not in use the selector switch is set to the position shown in the figure to avoid operation of the meter. After the instrument has been connected the selector switch is set to position I, in which the contactor arms 36, 37, 38 are set on contacts 39, 43, 46.

The zero balance switch 65 and the meter adjustment knob 17 and its vernier knob, are now operated to bring the pointer of meter 15 as closely as this is possible into the zero position. This is accomplished by reducing the resistance in the meter circuit. The meter vernier knob is turned clockwise to its end position and the meter adjustment knob 17 is then turned slowly in the same direction which is the direction of movement shifting contact 30 so as to reduce the resistance 31. The movement of the pointer is observed and the zero balance knob 65 moving contact 24 is turned in the direction in which it is intended to move the pointer, to keep it in or close to its zero position. When balanced the pointer will remain in its zero position when the knob 17 and its vernier knob are turned to their end position and the meter adjustment resistance is at its minimum.

When this meter reading has been reached manifestly a balance has been established between the following circuits:

Negative side of battery 9, terminal post 5, conductor 53, point 27, potentiometer 26, point 23, conductor 34, contactor 36, contact point 39, conductor 42, post 6 to the positive side of the battery 9.

A second circuit runs from terminal post 5 over conductor 49 to junction point a, with which one of the strands 11 showing a cross has been connected and over this strand 11 to the far end, where it is joined to the other strands and over strand 12 to junction point b, conductor 50, contact 43, contactor 37, conductor 32, conductor 34, contactor 36, contact 39, conductor 42 to terminal 6, and through battery 9 back to terminal post 5.

The adjustment of the potentiometer until a zero reading of the meter is obtained therefore is indicative of the absence of any current flow in either direction from point 24 of potentiometer 26 through meter 15 through resistor 31, conductor 33, contactor 38, contact 46, conductor 51, terminal c, wire 13 to the far end of the wire or strand which is being tested.

After the above described adjustments have been made switch 16 (inscribed Amp. Switch in Figure 1) is thrown and the reading is noted. This reading is used in the following position to adjust resistance 55 in such a manner that the same voltage obtained in position II is maintained.

The selector switch 35 may now be moved to position II, termed "base set position," in which the meter reading furnishes the base for the length of the line being tested. The located reading (position III) which is descried below expresses the location in terms which are related to this base. In order to facilitate and simplify the operation the meter reading in the base set position is preferably so adjusted by means of the meter adjusting knob and the meter vernier knob that it furnishes a predetermined value, the ratio of which to the following reading expressing the location of the fault, is of such a character that it may easily be translated into a distance.

When the instrument is in "base set position" or position II, the contactor arm 37 is on contact 44 and the contactor 38 on contact 47. The meter will furnish a reading which is different from zero because, as will be seen when tracing the circuits, the resistance of the cross between lines is now included in the meter circuit.

Tracing the circuits as before, it is seen that one circuit starting at post 5 connected with battery 9 runs over 53 and 27, through the potentiometer resistance 26 and over conductor 34 through contactor 36, 40 and 42 to terminal 6 connected with battery 9.

A second circuit runs from post 5 over 49, a and strand 11 through the cross between lines to strand 14, d, conductor 52, contact 47, contactor 38, 33, 31, 30, to 22, meter 15, 21, the point 24 and from there over 23, 34, 36, 40 to post 6 connected with battery 9.

Moreover a circuit is closed through resistance 55 from battery to post 5, point 56, resistance 55, 44, 37, 32, 36, 40, 42, post 6 to battery 9.

Switch 16 (inscribed Amp. Switch in Figure 1) is thrown and the variable resistor is now to be adjusted so that voltage at 5 and 6 is the same as that in positions I and III. This is necessary in order to provide for the difference in the resistance of the lines in the different positions of the instrument. Power lines for instance, have a very low resistance which would lower the voltage between points 5 and 6. In position II the circuit does not include the lines themselves and the voltage increases between points 5 and 6 due to the lighter load in the battery.

The voltage between 5 and 6 would therefore be much higher. The adjustment of resistor 31 would therefore be affected by this difference, if it were not eliminated.

As above indicated the resistance 31 is now adjusted using the meter adjustment knob 17 to a base value say, the reading 100 which permits to convert the following reading indicating the distance of the fault into a decimal fraction of the first reading.

The instrument is now brought into position III termed "location position."

The following circuits are thus formed. From battery post 5 over 49, a, 11 to the end of the line where the lines are joined and over line 12, b, 50, contact 45, 37, 32, 36, 41, 42, battery post 6.

The second circuit runs from battery post 5 over 53, potentiometer 26, 23, 34, 36, 41, 42 to battery post 6.

A further circuit is traceable from battery post 5, 49, a, line 11, cross, 14, d, 52, 48, contactor 38, 33, 31, 30, 22, meter 15, 21, 24.

The meter reading is now directly proportional to the distance of the cross from posts a, b, c, d.

This will be clear from the following explanation.

Let $R_1$ designate the total resistance of line 11
$R_2$ the resistance of line 12
$r_1$ the resistance of the potentiometer section 24—27 and
$r_2$ the resistance of the potentiometer section 23—24.

In position I (zero balance position) with the meter adjusted to zero $$\frac{r_1}{r_2} = \frac{R_1}{R_2} \qquad (1)$$

The voltage drop across $R_1$ equals the voltage drop across $r_1$ and the voltage drop across $R_2$ equals the voltage drop across $r_2$, the equation thus explains itself.

If the lines 11 and 12 do not have the same resistance the poteniometer is adjusted to a point 24 which corresponds to the above equation.

In position II (base set position) let $e_1$ be the voltage drop between points 24 and 27 of the potentiometer resistance, $r_1$ the resistance from point 24 to 27, R the resistance of the potentiometer 26 and e the voltage of the battery 9.

$$e_1 = \frac{r_1}{R} e \qquad (2)$$

This explains itself, as the voltage drop in the meter circuit between point 24 of the potentiometer 26 and its end 27 which is connected to line 11 is equal to the applied voltage e multiplied by the ratio between the resistance in the section furnishing $e_1$ and the total resistance of the potentiometer.

Let it be assumed now that the meter requires .00002 amp. to drive it to the end of the scale or to a preselected mark, such as the mark 100. In order to reach this point the meter is again adjusted by means of the adjustable resistance 31 which is in series with the fault.

Let now $i$ designate the current flowing through the meter $e_1$ the voltage in the meter circuit between points 24 and 27 of potentiometer 26.

Moreover let $R_f$ designate the resistance of the fault and
$R_3$ the resistance of 31 when adjusted.
In this case $$i = \frac{e_1}{R_f + R_3} \qquad (3)$$

In position III (location position) the connections are essentially the same as in position I except that the meter is now connected to one of the faulty conductors. The potentiometer 26 was adjusted in the first position in such a way that no current flows from the far end of the line through the meter to point 24. Therefore the voltage applied to the faulty line 11 between the near end or terminal $a$ and the point 24 of potentiometer 26 may be calculated. This voltage may be designated by $E_1$.

$$E_1 = \frac{R_1}{R_1+R_2}e \tag{4}$$

If $E_2$ designates the voltage drop between the far end of the line and the fault, $r_f$ the resistance of the section of line 11 from the far end to the fault, and $R_1$ the total resistance of the line 11 to the point 24 of the potentiometer, then the voltage $$E_2 = \frac{r_f}{R_1}E_1 \tag{5}$$

The current through the meter is directly proportional to the voltage and may be designated by $i_1$ $$i_1 = \frac{E_2}{R_f+R_3} \tag{6}$$

The location of the fault is proportional to $$\frac{i_1}{i}$$

$$\text{Location} = \frac{\text{current through meter in position III}}{\text{current through meter in position II}}$$
(7)

*Example*

Let it be assumed that the total length of the cable with the fault is 5000 feet, that the total resistance of each conductor is 20 ohms, that the size of the conductors is #16 copper and that the fault resistance is 150.000 ohms. Moreover the total potentiometer resistance is 200 ohms, the voltage of the battery is 10 volts, the location of the fault is in the middle of the conductor and the current required to drive the meter to the end of the scale is .00002 amp.

Position I (balance zero position)

(1) $\quad \frac{r_1}{r_2} = \frac{R_1}{R_2}; \frac{20}{20} = \frac{100}{100}$

Position II (base set position)

(2) $\quad e_1 = \frac{R_1}{R}e; \frac{100}{200} \cdot 10 = 5$ volts

The voltage drop along line 11 to point 24 on the potentiometer is therefore 5. volts.

$$i = \frac{e_1}{R_f+R_3}; .0002 = \frac{5}{150.000+100.000}$$

Base set current is .00002.

Position III (location position)

(4) $\quad E_1 = \frac{R_1}{R_1+R_2}e; \frac{20}{20+20} \cdot 10. = 5$ (5) $\quad E_2 = \frac{r_f}{R_1}E_1; \frac{10}{20} \cdot 5. = 2.5$ 2.5 volts being the voltage drop from the far end to the fault.

(6) $\quad i_1 = \frac{E_2}{R_1+R_2}; .00001 = \frac{2.5}{150.000+100.000}$ (7)
$$\text{Location \%} = \frac{\text{current through meter in position 3}}{\text{current through meter in position 2}}$$

$$\frac{1}{2} = \frac{.00001}{.00002}$$

$$5000 \text{ feet} \cdot \frac{1}{2} = 2500 \text{ feet from far end}$$

In Figure 3 a modification of the instrument is illustrated which embodies a neutralizer for stray currents. The general object of this modification will be better understood when reference is made to the fact, mentioned above, that the instrument is usable for fault location in all cases of line to line and of line to ground faults. In the latter case clearly a ground connection is involved. However in all cases it is sometimes necessary to use a ground connection as a substitute for a clear line. In all cases in which a ground connection has to be used stray currents and so-called parasitic currents invading the ground used may cause instrument readings which affect appreciably the result.

It is therefore one of the objects of the modification shown in Figure 3 to provide means for eliminating the defects due to such stray currents.

Figure 2:
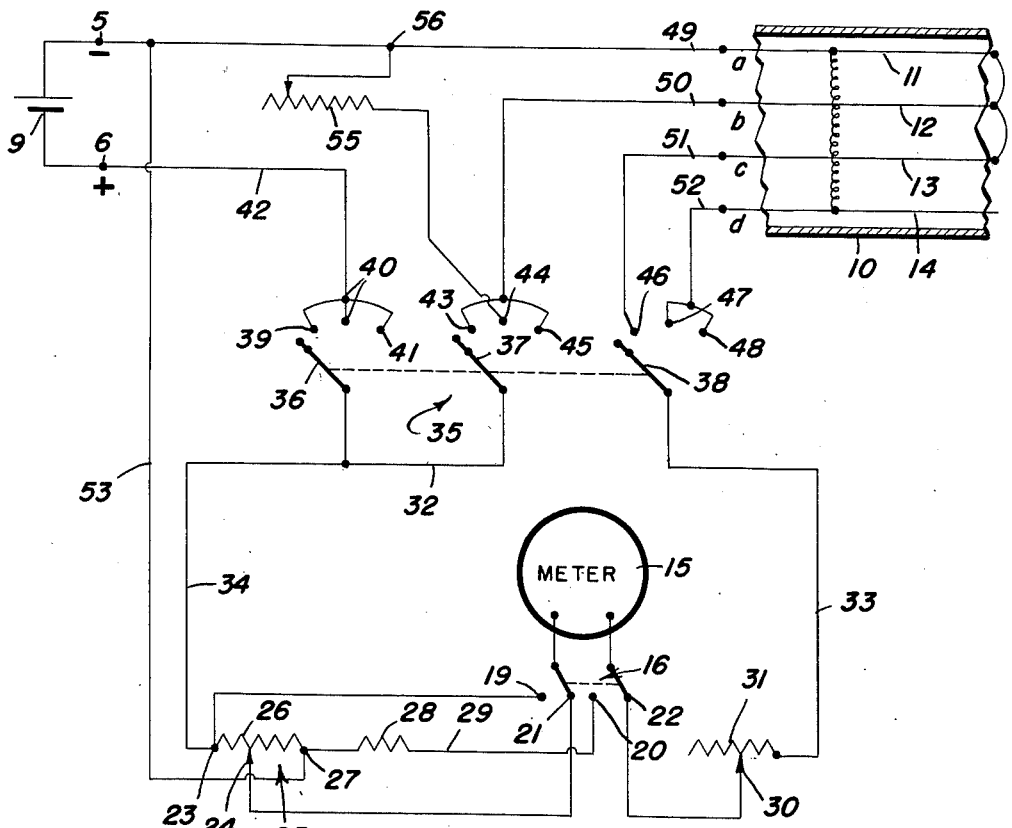
Figure 2 is a diagram of the connections within the instrument.

The arrangement of the instrument in most respects is essentially the arrangement shown in Figures 1 and 2.

This arrangement includes the selector switch 35 with contactor arms 36, 37, 38 each arm cooperating with three contacts 39, 40, 41, 43, 44, 45; and 46, 47, 48 respectively, connected in the manner described with the battery posts 5 and 6 and with the terminal posts $a$, $b$, $c$, $d$ with which the strands 11, 12, 13, 14 of the cable 10 are connected.

A fourth contactor arm 58 is however ganged with the three arms 36, 37, 38 cooperating with the contacts 59 which are all joined and are connected with conductor 61 leading to a battery 60. This battery is used to counteract the voltages due to parasitic or stray currents.

The battery is connected with a potentiometer resistance 70 connected with battery 60 by conductors 61 and 62 which is shown to be arranged in a circle with a movable arm 71 turning around a pivot 72. The potentiometer arm 71 is connected with conductor 73 leading to the meter 15.

Connected with the potentiometer arm is a switch 75 for changing the polarity of the currents derived from battery 60.

Switch 75 comprises an arm 76 which is mechanically connected with the potentiometer arm 71 in such a manner that when the potentiometer arm moves in one direction indicated by one of the arrows the switch arm will assume one position, while when the arm 71 moves in the other direction the switch arm 76 will assume a second position indicated in dotted lines.

The switch arm cooperates with the two fixed contacts 77, 78 respectively which are joined to the two conductors 61, 62 and therefore to two battery sides by conductors 81 and 82 respectively.

The mechanical connection between arms 71 and 76 may be of any type and the circular shape of the potentiometer resistances and the rotation of potentiometer arm 71 around a shaft or axle 72 is merely an example.

The switch arm 76 in this case is pivoted to rock around pivot 79 and carries at its end a head, knob, roller or the like 83 which runs on the inside of a guide or cam ring 84, moving with the shaft or axle 72 carrying the arm. Movement of arm 71 entails a movement of the cam ring 84 and the frictional engagement between this ring and head 83 moves arm 76 in one direction and keeps the arm seated on one contact as long as the same direction of movement continues. Movement of arm 72 in the opposite direction shifts switch arm 76 to the other contacts and keeps it on this contact until the movement is reversed.

A further improvement consists in the voltage divider or potentiometer 86, which is divided so as to have a center connection 87. This potentiometer is used alternatively with potentiometer 26 in the case that the lines of the cable may all be considered as completely equal. A switch 88 permits to switch in alternatively either potentiometer 26 or potentiometer 86.

In order to obtain a fine adjustment (vernier adjustment) of the potentiometer resistance 26, a further or additional resistance 91 is provided along which a contactor 92 may slide. The arms 92 and 24 are mechanically connected in such a manner that when, for instance, contactor arm 92 is moved to the left and reaches its end position it now moves contactor 24. The same coupling occurs when arm 92 is moved to the extreme right. Mechanically this type of coupling may be obtained by coupling a unit consisting of 91, 92 with a link operating contactor 24, and providing a hand lever moving contactor 92. When the latter reaches one of the end stops, it will then move the contactor 24.

The meter, in addition to its connections already described, has a short circuit connection 96 which is closed by selector switch contactor 33 when in its original position or position of rest. The contactor arm is then positioned on contact 93 and the short circuit of the meter prevents accidental damaging of the same and pointer movement during transport.

The operation of the instrument described in Figure 3 is essentially the same as that described in connection with the instrument shown in Figures 1 and 2 and only the additional equipment need be described.

When lines are supposed to be equal switch 88 may be thrown to the position shown in full lines and it will then be clear that the meter circuit in position I (balance zero position) is connected to the middle 87 of potentiometer 86 on one hand and to the point of junction of the cable strands on the other hand with the two halves of potentiometer 86 and the two cable strand lengths exactly balancing each other. When the switch 16 (Amp. switch) is turned, the circuit may be so changed that the meter is used as an ammeter instead of being used as a voltmeter as shown in Figure 2. A more accurate reading for the adjustment of resistor 55 may thus be obtained.

Measurements in position II (base set position) are carried out in the way described in connection with the first modification except that the influence of stray currents is eliminated in the following manner.

When the selector switch 35 has been brought into position II, the carbon pile compression resistance 55 is properly adjusted in accordance with the reading obtained in position I. The operating battery 9 is disconnected and the meter adjustment knob which operates resistance 31 is now adjusted to reduce the resistance in the meter circuit which makes the meter 15 more sensitive.

As previously explained, however, the meter is connected with the cross in this position over the line 14, d, 52, 47, 38, 33, meter 15, the lines 73 and 85, 30, 31, 87, 86, 53, 5, 49, a, line 11, cross to line 14.

The potentiometer arm 71 is either completely on the right or completely on the left side without including part of the potentiometer resistance. If the meter now shows a reading this reading is entirely due to stray currents at the cross, as battery 60 is merely closed through potentiometer 70 and is without influence in the position of arm 71 mentioned above.

The instrument is now adjusted to zero by turning arm 71. If the pointer returns upon movement of the arm the polarity of the battery is correctly selected and arm 71 is advanced until the pointer is in the zero position. If the pointer does not move in the direction toward zero, arm 71 is first turned in the other direction and is then slowly advanced until the desired reading has been obtained. For the following operations which are in exact parallelism to those already described a current compensating the stray currents exactly has now been introduced, which corrects the deviation caused by the latter.

It will be clear that the details may differ from those shown without in any way departing from the essence of the system.

Having described the invention, what is claimed as new is:

1. A device for locating faults in cables and overhead lines with a plurality of conductors comprising a testing battery, a series of terminals adapted to be connected fixedly with the faulty and clear conductors of the cable to be tested, a meter, and a meter circuit, the latter being connected with one side of the battery and including adjustable resistances, a switching means including a plurality of switch arms, each arm cooperating with a group of contacts, one of said terminals, being connected with the other side of the testing battery, a further terminal of the series which is adapted to be connected with a clear conductor, being connected with contacts of a group, cooperating with one of the individual switch arms of the switching means, a further contact of said group being connected with one side of the testing battery, said connection including a variable resistance, a further terminal of the series being connected with the clear and faulty conductors of the cable and with the contacts of a group cooperating with a further individual switch arm of the switching means, said switch arm being connected with the meter circuit, while the first named individual switch arm is connected with the other side of the testing battery.

2. A device for locating faults in cables and overhead lines with a plurality of conductors, comprising a testing battery, a series of terminals adapted to be connected fixedly with the faulty and clear conductors of the cable to be tested, a meter and a meter circuit, the latter being adapted to be connected with the testing battery, this connection including a potentiometer with a shiftable contact and a further variable resistance, a switching means with at least two individual contact arms, each arm cooperating with a group of two contacts, said contact arms being connectable with the testing battery and with the meter circuit respectively and the contacts cooperating with said contact arms being connected with the terminals with which the conductors of the cables have been connected and with an adjustable resistance, bridging the testing battery, respectively, one of said individual contact arms thus alternatively connecting the meter circuit with a clear and a faulty conductor, respectively, a further switch arm being connectable with the testing battery, connecting alternatively a terminal joined to a clear conductor of the cable with the testing battery or connecting the adjustable resistance across the battery and means for mechanically connecting said contact arms so as to connect simultaneously the battery with a clear conductor, while connecting simultaneously the meter circuit with the faulty conductors.

3. A device for locating faults in cables and overhead lines with a plurality of conductors, comprising a testing battery, a series of terminals adapted to be connected with the faulty and clear conductors of the cable to be tested, a meter and a meter circuit, the latter provided with a potentiometer adapted to be connected with the battery, and having a shiftable contact, said meter circuit being further provided with a variable resistance in series with the meter, a switching means comprising a plurality of individual switch arms adapted to assume three positions, each individual switch arm cooperating with three switch contacts, two of said individual switch arms being connected with each other and connectable with one side of the testing battery, and contacts cooperating with said two individual switch arms connected with a clear conductor, connection between said clear conductor and one side of the battery being made for a first and third measurement by said two individual switch arms, a further individual switch arm connected with the meter circuit cooperating with contacts connected with terminals connected with clear and faulty conductors respectively, mechanical means for moving the plurality of individual switch arms simultaneously so as to make a connection of the meter circuit with a clear conductor simultaneously with a connection of the battery with a clear conductor for the first measurement, and the last mentioned connection being made simultaneously with the making of a connection of the meter circuit with a faulty conductor for a second and third measurement.

4. A device for locating faults in cables as claimed in claim 2, wherein the meter circuit is provided with a battery testing switch and a special battery testing circuit, including a resistance, said switch shifting the connections of the meter from the meter circuit to the battery testing circuit directly connected with both sides of the battery.

5. A device for locating faults in cables and overhead lines with a plurality of conductors comprising a testing battery, a series of terminals adapted to be connected fixedly with the faulty and clear conductors of the cable to be tested, a meter and a meter circuit, adjustable variable resistances in said meter circuit, a connection between one side of the testing battery and one of the terminals adapted to be connected with a faulty conductor, switching means for making a plurality of connections for connecting the other side of the battery with a terminal connected to a clear conductor, means for connecting the meter circuit to one side of the battery for all measurements, switching means for making a plurality of connections alternatively connecting the meter circuit with a terminal connected with a clear conductor and with a terminal connected with a faulty conductor and means for mechanically connecting the two last named swithing means and for coordinating their operation for simultaneously making a connection of the battery and of the meter circuit with clear conductors, for simultaneously interrupting the connection between battery and clear conductor, while making a connection between the meter circuit and a faulty conductor and for making a connection between one side of the battery and a clear conductor while maintaining the last mentioned connection of the meter circuit.

6. A device for locating faults in cables and overhead lines with a plurality of conductors comprising a testing battery, a series of terminals adapted to be connected fixedly with the faulty and clear conductors of the cable to be tested, a meter and a meter circuit, adjustable variable resistances in said meter circuit, switching means for making a plurality of connections connecting the testing battery on one side with one of the faulty conductors, further switching means for making a plurality of connections connecting the other side of the battery with a terminal, connected to a clear conductor, means for connecting the meter circuit to one side of the testing battery, a potentiometer and a second battery connected across the potentiometer resistance, means for taking off currents of predetermined polarity and intensity from said potentiometer, the latter being included in the connection of the meter circuit and the testing battery for producing a compensation of the influence of stray currents picked up by faulty conductors, and means for alternatively connecting the meter circuit with terminals connected with a clear and faulty conductor respectively.

7. A device for locating faults in cables and overhead lines with a plurality of conductors comprising a testing battery, a series of terminals adapted to be connected fixedly with the faulty and clear conductors of the cable to be tested, a meter, and a meter circuit, the latter being connected with the testing battery and including an adjustable resistance, a switching means including a plurality of ganged switch arms, each arm cooperating with a number of contacts, one of said terminals being connected with the testing battery, said connection including one of said switch arms for controlling the connection of the testing battery with a clear conductor, a potentiometer including a potentiometer resistance, a battery connected across the same, and a movable potentiometer contact, a polarity changing switch, cooperating with the said potentiometer adapted to reverse the polarity of the current taken from the movable switch arm in accordance with the direction of movement of the same, said potentiometer being inserted into the meter circuit and adjusted to compensate for currents moving the conductors from the outside and further a switching arm controlling the alternative connection of the meter circuit with a clear and a faulty conductor.

8. In a device for locating faults as claimed in claim 7, a parallel circuit to the meter and a contact for one of the switch arms arranged in the position of rest, said parallel circuit being closed by the switch arm in the position of rest to short circuit the meter in this position.

9. The method of locating a faulty point in cables and overhead lines with a plurality of conductors by a measurement using a meter, an adjustable meter circuit including adjustable resistances and a test battery, which method consists in joining the conductors of the cable at the far end, in making a first measurement for comparing the relation of unknown resistances in the cable with known resistances in the meter circuit by means of two circuits, the first circuit including one of the faulty conductors of the cable, one of the faultless conductors and the test battery, and the second circuit including the meter circuit joined to the battery and to one of the faultless conductors, said second circuit being joined to the first circuit by the connection of the cable conductors at the far end, in making a second base set measurement for establishing a base for the location of the fault, said second measurement being carried out by means of a circuit including the meter circuit, the defective conductors of the cable and the test battery, and in making a third measurement indicating the location of the fault by comparison, said third measurement being made over a circuit combination, one of the circuits of which is identical with the first circuit used during the first measurement and the other circuit of which includes the meter circuit connected with the faulty conductor and the test battery, the said other circuit being joined to the said first circuit by the connection of the conductors of the cable at the far end, the ratio of the second and third measurements giving directly the indication of the location of the faulty point.

10. The method of fault locations in cables and overhead lines with a plurality of conductors, having faulty points occurring in pairs of conductors, by means of a test battery, a meter, an adjustable meter circuit, including an adjustable potentiometer resistance, the fixed resistance of which is permanently connected with the test battery, while the meter is connected with the adjustable potentiometer contact, which method consists in joining the conductors of the cable at the far end, and in joining one side of the test battery to one of the faulty conductors for all measurements, in making a first zero balance measurement for determining the relation between the unknown resistances in the cable conductors to known resistances in the meter circuit, the meter being brought to a predetermined zero reading by the adjustment of the adjustable meter circuit resistances and the meter being in a combination of two circuits, the first circuit of the combination including the test battery joined on one side to one of the faulty conductors of the cable, and a faultless conductor joined to the other side of the test battery, the second circuit of the combination being the meter circuit, the potentiometer of which is connected to both sides of the test battery and the said meter circuit being further connected with a faultless conductor joined to the other cable conductors at the far end, the circuit arrangement of said first measurement thus forming a bridge circuit with the entire length of the two conductors of the cable connected to the test battery and the meter connected in the bridge including one of the faultless conductors of the cable, in making a second base set measurement to establish a base for the location of the fault, measuring the current flowing in a circuit, including the second conductor of the faulty pair, the meter circuit, the first named faulty conductor permanently connected with one side of the battery, the said circuit thus including the faulty connection, in making a third fault location measurement, measuring the current flow and determining its ratio with respect to the current flow measured by the second base set measurement, the current flow being measured in a combined circuit, one circuit section of which is identical with the first circuit of the first zero balance measurement, using the identical adjustment made for the said first measurement, and the second circuit section of the combined circuit being formed by the meter circuit with the connections and adjustments made for the second measurement, the ratio of the meter readings made during the second and third measurements being proportional to the ratio between the distance of the fault and the entire length of the conductors.

11. In the method of fault locating for use in cables and overhead lines with a plurality of conductors as claimed in claim 10, the additional step of measuring the voltage of the test battery before the first and third measurements and of connecting an adjustable resistance across the test battery and adjusting the said resistance so that the battery voltage will be the same as found during the first and third measurements when making the second or base set measurement.

RICHARD F. MILLER.

REFERENCES CITED

The following references are of record in the file of this patent:

UNITED STATES PATENTS

| Number | Name | Date |
| --- | --- | --- |
| Re. 21,784 | Borden | Apr. 29, 1941 |
| 754,402 | Wiseman | Mar. 8, 1904 |
| 1,130,036 | Sprong | Mar. 2, 1915 |
| 2,032,493 | Newhall, Jr. | Mar. 3, 1936 |
| 2,176,759 | Borden | Oct. 17, 1939 |

OTHER REFERENCES

Electrical World, November 21, 1925, pages 1041–1045.